H. TAYLOR, A. P. TAYLOR, & C. PALM.
Improvement in Hubs for Vehicle Wheels.

No. 122,742. Patented Jan. 16, 1872.

Witnesses.
J. H. Burridge.
D. S. Humphrey.

Inventors.
H. Taylor.
A. P. Taylor.
C. Palm.
per Burridge & Co.
Attys.

UNITED STATES PATENT OFFICE.

HIRAM TAYLOR, OF MILTON, ALFRED P. TAYLOR, OF MINERAL RIDGE, AND CYRUS PALM, OF JACKSON, OHIO.

IMPROVEMENT IN HUBS FOR VEHICLE-WHEELS.

Specification forming part of Letters Patent No. 122,742, dated January 16, 1872.

SPECIFICATION.

*To all whom it may concern:*

Be it known that we, HIRAM TAYLOR, of Milton, in the county of Mahoning and State of Ohio, ALFRED P. TAYLOR, Mineral Ridge, Trumbull county, Ohio, and CYRUS PALM, Jackson, Mahoning county, Ohio, have invented a certain new and Improved Carriage-Wheel Hub; and we do hereby declare that the following is a full, clear, and complete description thereof, reference being had to the accompanying drawing making part of the same.

Figure 1:
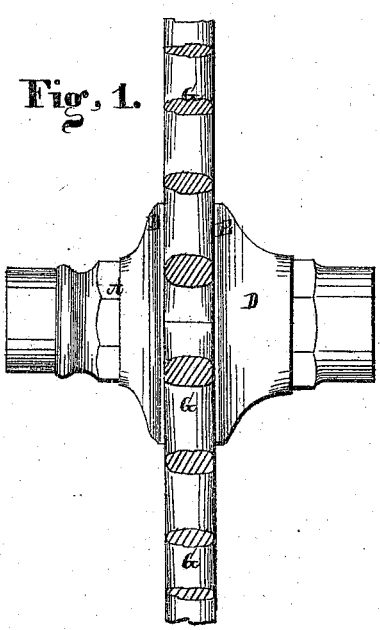
Figure 2:
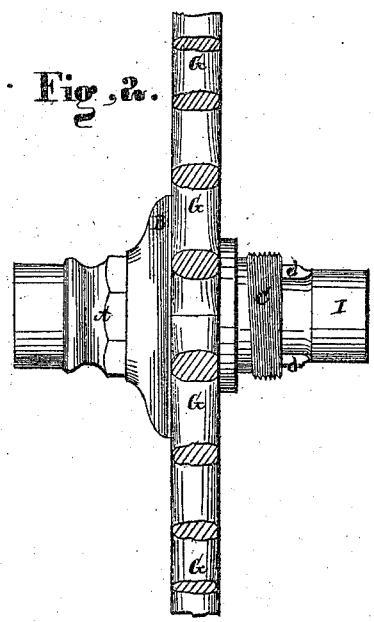
Figure 3:
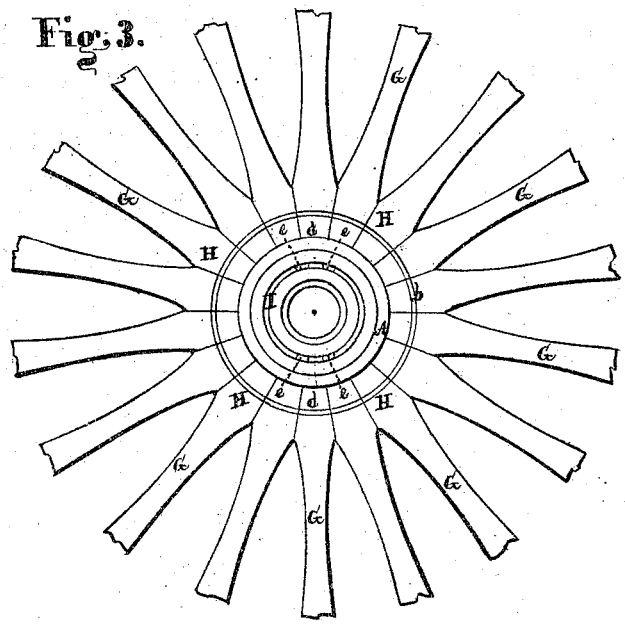
Figure 4:
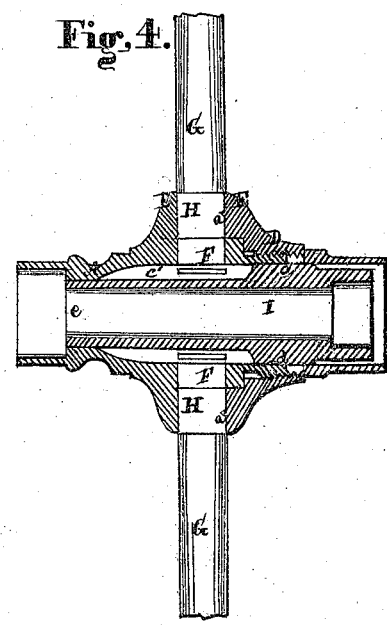

Figure 1 is a side view of the hub. Fig. 2 is a side view of the hub with a section thereof detached. Fig. 3 is an end view of the hub as shown in Fig. 2. Fig. 4 is a transverse longitudinal section.

Like letters of reference denote like parts in the different views.

The nature of this invention relates to a metal carriage-hub; and the object of the same is to so construct the hub that the shoulders of the spokes shall lie wedging against each other, while the tenons thereof are fitted in mortises cut in a shell constituting a part of the hub, in which shell the axle-box is secured. The shoulders of the spokes are braced laterally by a broad flange, forming a part of the shell, and against which they are clamped by a corresponding flange forming a part of a nut screwed onto the inner end of the shell, and which nut and shell constitute the hub. It also relates to the manner of securing the axle-box in the hub.

A more full and complete description of the hub is as follows:

In Fig. 2, A represents the shell above referred to, of which B is a flange and C a male thread, onto which is screwed a nut, D, having a flange, E, Figs. 1 and 4, corresponding to the flange B, between which the shoulders of the spokes are clamped, as shown in Fig. 1.

It will be observed that the tenons F of the spokes G are fitted in mortises cut in and through the shell, as shown in Fig. 4, and that the shoulders H of the spokes are made wedging in shape, as shown in Fig. 3, so that on being driven into the mortises they mutually wedge and bind each other in their circumferential direction, and which are supported laterally by the flanges B E, the flanged nut D being screwed onto the end of the shell for that purpose, as shown in Fig. 4.

It will be observed that on the face of the flange of the nut there is a continuous rib, $a$, fitted in a corresponding groove, $b$, cut in the side of the spokes, as shown in Fig. 3, the purpose of which is to assist in securing the spokes in the hub, as they cannot be pulled out therefrom unless the nut is first removed.

I, Fig. 2, is the axle-box. Said box is secured in the shell A by having its anterior end $c$ turned and closely fitted in the end of the shell, as shown in Fig. 4, whereas the posterior end is secured in position by a pair of ears, $d$, projecting from two opposite sides of the box, as shown in Fig. 2. Said ears are held by a pair of lugs, $e$, Fig. 3, between which each ear is lodged, and by which the axle-box is also prevented from turning.

By this means the box is not only securely confined in the shell, but it is also held isolated therefrom, leaving a space, $c'$, between the axle-box and inside of the shell, and also concentric in its relation to the hub, so that the wheel will run true, and which, when so worn as to be loose on the axle, can be easily taken out and a new one inserted in its place.

*Claims.*

What we claim as our invention, and desire to secure by Letters Patent, is—

1. The combination of section A, having a flange, B, and screw $c$, nut D having a flange and an annular rib, $a$ E, spokes G having their ends H wedge-shape and in contact with each other, and axle-box I fitted in the shell A, all substantially in the manner as and for the purpose set forth.

2. The axle-box I secured in the shell or section A, concentrically therewith, by means of its anterior end $c$ being closely fitted in the shell A and its posterior end secured by ears $d$ and lugs $e$, substantially in the manner as described, and for the purpose specified.

HIRAM TAYLOR.
    ALFRED P. TAYLOR.
    CYRUS PALM.

Witnesses:
 W. H. BURRIDGE,
 J. H. BURRIDGE.